(12) United States Patent
MacFarland et al.

(10) Patent No.: US 6,264,338 B1
(45) Date of Patent: Jul. 24, 2001

(54) MIRROR STABILIZING CONSTRUCTION

(75) Inventors: Robert W. MacFarland, Rochester; Richard T. Young, Lowell, both of MI (US)

(73) Assignee: Adac Plastics, Inc., Grand Rapids, MI (US)

( * ) Notice: Subject to any disclaimer, the term of this patent is extended or adjusted under 35 U.S.C. 154(b) by 0 days.

(21) Appl. No.: 09/483,287

(22) Filed: Jan. 14, 2000

(51) Int. Cl.[7] .................................................. G02B 7/182
(52) U.S. Cl. .......................... 359/871; 359/872; 359/850; 359/838; 359/841
(58) Field of Search ........................ 359/871, 872, 359/850, 838, 841, 843, 844, 845, 846, 865, 878, 223, 224, 225, 226, 555, 556

(56) References Cited

U.S. PATENT DOCUMENTS

| | | | |
|---|---|---|---|
| 4,257,452 | * 3/1981 | Hill et al. | 137/514.7 |
| 4,318,590 | * 3/1982 | Hanley | 359/224 |
| 4,892,400 | * 1/1990 | Brookes et al. | 359/871 |
| 5,412,514 | * 5/1995 | Zebold et al. | 359/878 |
| 5,604,644 | * 2/1997 | Lang et al. | 359/871 |
| 5,918,862 | * 7/1999 | Nelson | 267/64.23 |

* cited by examiner

*Primary Examiner*—Mohammad Sikder
(74) *Attorney, Agent, or Firm*—Young & Basile, P.C.

(57) ABSTRACT

An outside rearview mirror assembly for a motor vehicle of the type in which the mirror glass is selectively movably relative to the mirror housing to achieve the desired rearview image. A viscous damper device is positioned within the mirror housing, interconnects the mirror housing and the mirror glass, and is operative to damp vibrational movement of the mirror glass relative to the mirror housing so as to present a steady mirror image to the operator.

14 Claims, 5 Drawing Sheets

FIG-13

MIRROR STABILIZING CONSTRUCTION

FIELD OF THE INVENTION

This invention relates to rearview mirrors and more particularly to rearview mirrors for motor vehicles having a mirror glass mounted for selective movement relative to the mirror housing.

BACKGROUND OF THE INVENTION

Motor vehicle rearview mirrors typically employ an arrangement whereby the mirror glass may be selectively adjusted relative to the mirror housing whereby to selectively adjust the mirror image perceived by the vehicle operator. The movability of the mirror glass relative to the mirror housing, however, creates a problem in that the movable mounting of the mirror glass relative to the housing has a tendency to introduce vibration of the mirror glass relative to the mirror housing with resultant blurring of the image perceived by the operator in the mirror glass.

SUMMARY OF THE INVENTION

This invention is directed to the provision of an improved rearview mirror assembly for a motor vehicle.

More specifically, this invention is directed to the provision of a rearview mirror assembly for a motor vehicle wherein the mirror glass is readily adjustable relative to the mirror housing to selectively vary the image perceived by the operator but wherein mirror glass vibration is effectively eliminated.

The invention relates to an outside rearview mirror assembly for a motor vehicle including a housing adapted to be rigidly attached to the motor vehicle and including an annular rim circumscribing a cavity defined by the housing; and a mirror glass assembly positioned in the cavity within the housing rim and mounted for selective movement relative to the housing to selectively vary the position of the mirror glass assembly relative to the housing and thereby selectively vary the image perceived in the mirror glass assembly by a motor vehicle operator.

According to the invention, the mirror assembly further includes a damper device positioned within the housing cavity, extending between the housing and the mirror glass assembly, and operative to damp vibrational movement of the mirror glass assembly relative to the housing. With this arrangement, the mirror presents a steady mirror image to the operator while not interfering with the selective movement of the mirror relative to the mirror housing for mirror adjustment.

According to a further feature of the invention, the damper device comprises a first member defining a chamber, a second member defining a slide structure mounted for reciprocal movement in the chamber, and a viscous material trapped in the chamber and dampening the reciprocal movement of the slide structure in the chamber. This arrangement provides a simple and effective means of readily dampening any tendency of the mirror glass to vibrate relative to the mirror housing.

According to one embodiment of the invention, the second member comprises a piston defining the slide structure it one end thereof and secured at another end thereof to one of the housing and the mirror glass assembly, and the first member comprises a cylinder positioned in the cavity, containing the viscous material, slidably receiving the one end of the piston, and secured at another end thereof to the other of said housing and said mirror glass assembly. This simple piston/cylinder arrangement provides a ready and effective structure for dampening the mirror vibrations.

According to an alternate embodiment of the invention, the first member comprises a first arm secured at a first end thereof to one of the housing and the mirror glass assembly and defining the chamber at a second end thereof, and the second member comprises a second arm secured at a first end thereof to the other of the housing and the mirror glass assembly, pivotally connected at a second end thereof to the second end of the first arm, and carrying a vane structure at the second end thereof constituting the slide structure and rotatably received in the chamber. This knee action arrangement provides a further simple and effective means of dampening the mirror vibration.

According to a further alternate embodiment of the invention, the damper device includes a cylinder containing a viscous fluid, a vane mounted for rotary movement in the cylinder, and means operative to rotate the vane relative to the cylinder in response to vibrational movement of the mirror glass assembly relative to the housing. The operative means may comprise, for example, a pinion secured to the vane, a rack driving the pinion, and link means secured to spaced points on the mirror glass assembly and operative to move the rack in response to vibrational movement of the mirror glass assembly.

DESCRIPTION OF THE PREFERRED EMBODIMENTS

Figure 1:
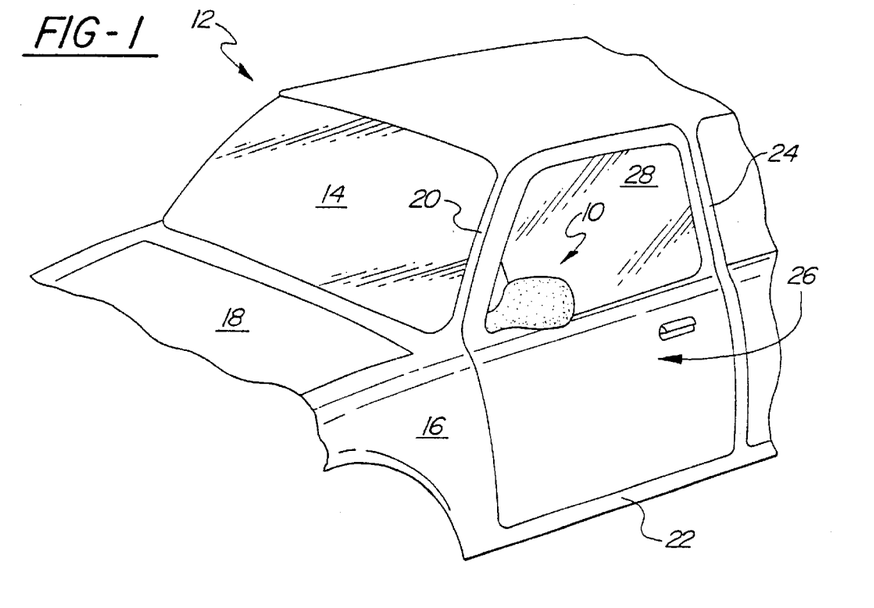
FIG. 1 is a fragmentary, perspective view of a motor vehicle employing a rearview mirror assembly according to the invention.

The invention rearview mirror assembly 10 is seen in FIG. 1 in association with a fragmentarily shown motor vehicle 12 including a windshield 14, a front quarter panel 16, a hood 18, an A pillar 20, a sill 22, a B pillar 24, and a door 26 positioned in the door opening defined by the A pillar 20, front quarter panel 16, sill 22, and B pillar 24. Mirror assembly 10 in known manner is mounted on the door proximate the front, hinged edge of the door in general alignment with the lower edge of the window glass 28.

Rearview mirror assembly 10 (FIGS. 2 and 3) comprises a housing 30, a mirror glass assembly 32, a positioning device or actuator 34, and a viscous damper device 36.

Figure 2:
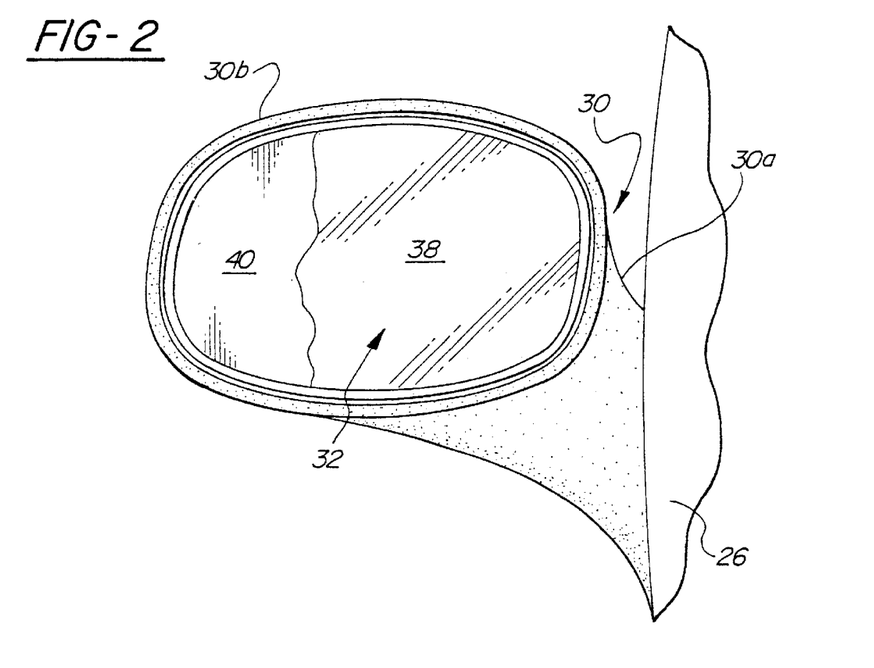
FIG. 2 is a rear elevational view of the invention mirror assembly.
Figure 3:
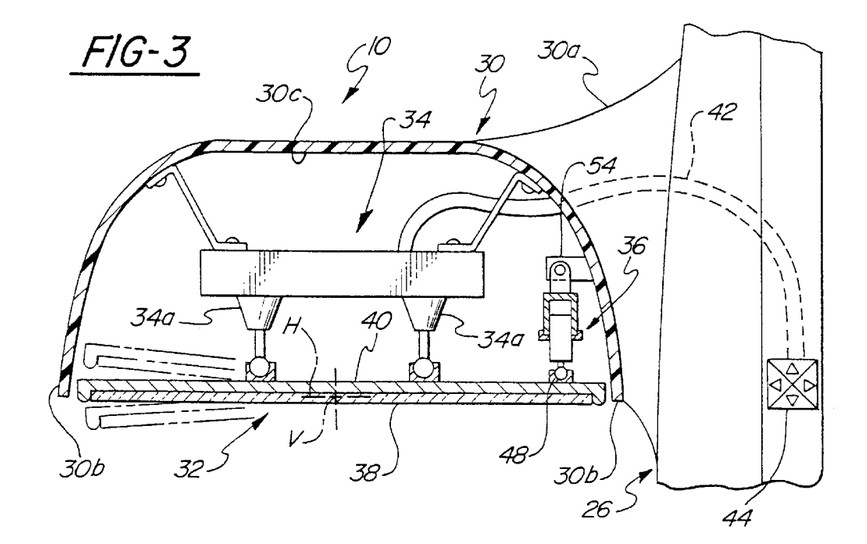
FIG. 3 is a fragmentary, detail view of the invention mirror assembly.

Housing 30 includes a base portion 30a adapted to secure the mirror housing to the vehicle door 26 and an annular rim 30b circumscribing a cavity 30c defined by the housing.

Mirror glass assembly 32 includes a mirror glass 38 positioned in the cavity 30c within the rim 30b and a backing plate 40 positioned in the cavity in backing relation to the mirror glass.

Positioning device 34 is mounted on the mirror housing 30 within cavity 30c behind mirror glass assembly 32 and includes, in known manner, a plurality of actuators 34a attached to the rear face of the backing plate 40 and operative to provide selective movement of the mirror glass assembly relative to the housing about a plurality of axes including, typically, at least one vertical axis V and at least one horizontal axis H. A control cable 42 connects positioning device 34 with a suitable control member 44 positioned, for example, on the arm rest 26a of the door 26 of the vehicle and operative in known manner in response to selective movement of the control member to move the mirror glass assembly relative to the mirror housing in directions corresponding to the direction of movement of the control member, whereby to selectively move the mirror glass assembly relative to the housing between the solid line and dash line positions seen in FIG. 1 and thereby selectively vary the image perceived in the mirror glass assembly by a motor vehicle operator. Positioning device 34 may comprise, for example, a jack screw type actuator available from Matsuiama of Kawagoe, Japan or a planetary-gear actuator available from Industries Kootbv of Montfoort, Netherlands.

Viscous damper device 36, broadly considered, comprises a first member defining a chamber, a second member defining a slide structure mounted for reciprocal movement in the chamber, and a viscous material trapped in the chamber and dampening the reciprocal movement of the slide structure in the chamber.

Figures 4, 5:
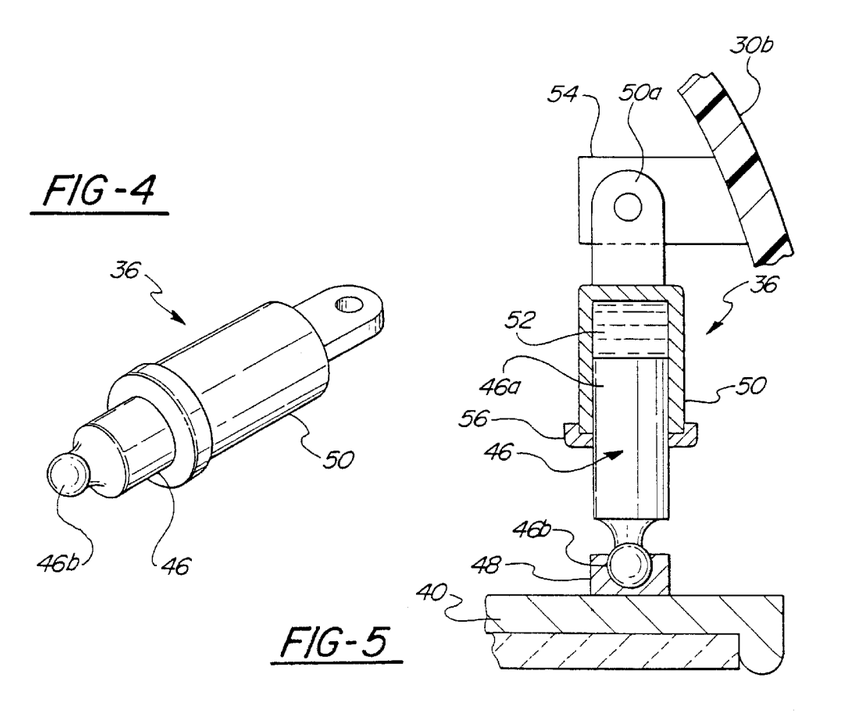
FIG. 4 is a perspective view of a damper device utilized in the invention mirror assembly.
FIG. 5 is a detail view of the damper device.
Figure 6:
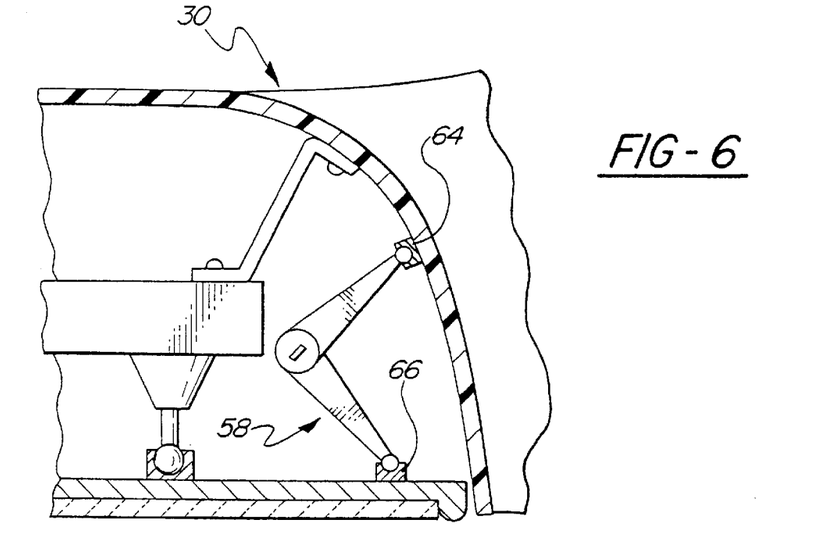
FIG. 6 is a fragmentary view of an alternate form of damper device.
Figures 7, 8:
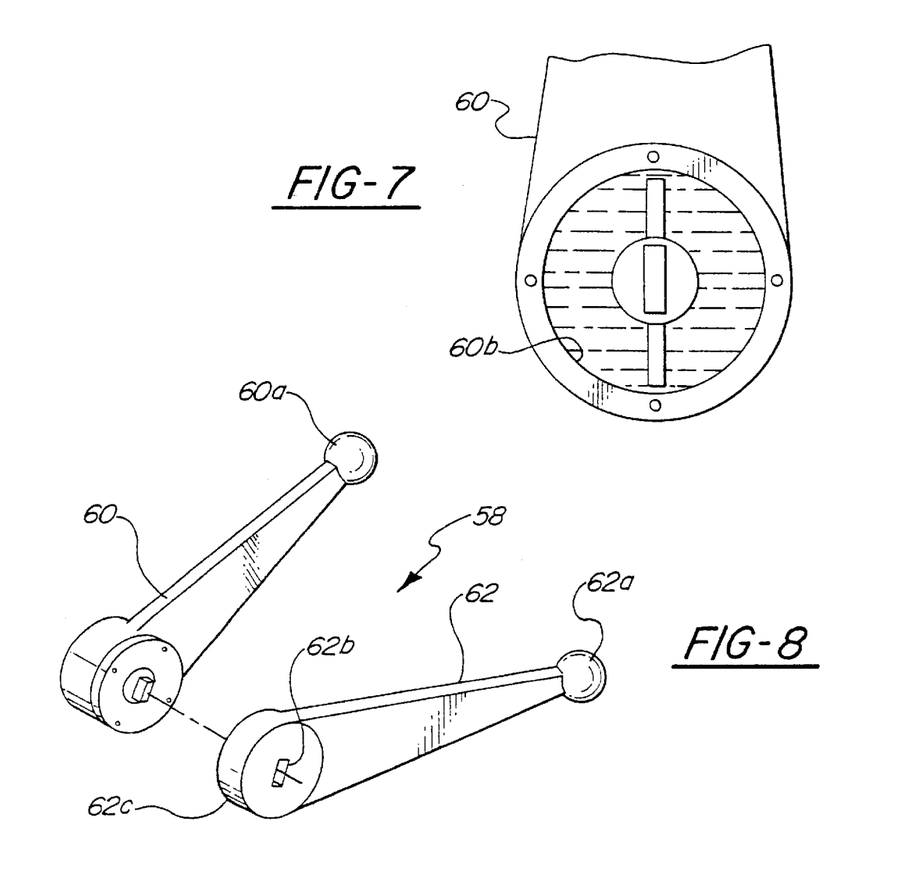
FIGS. 7, 8, 9, and 10 are detail views of the alternate damper device of FIG. 6.
Figure 9:
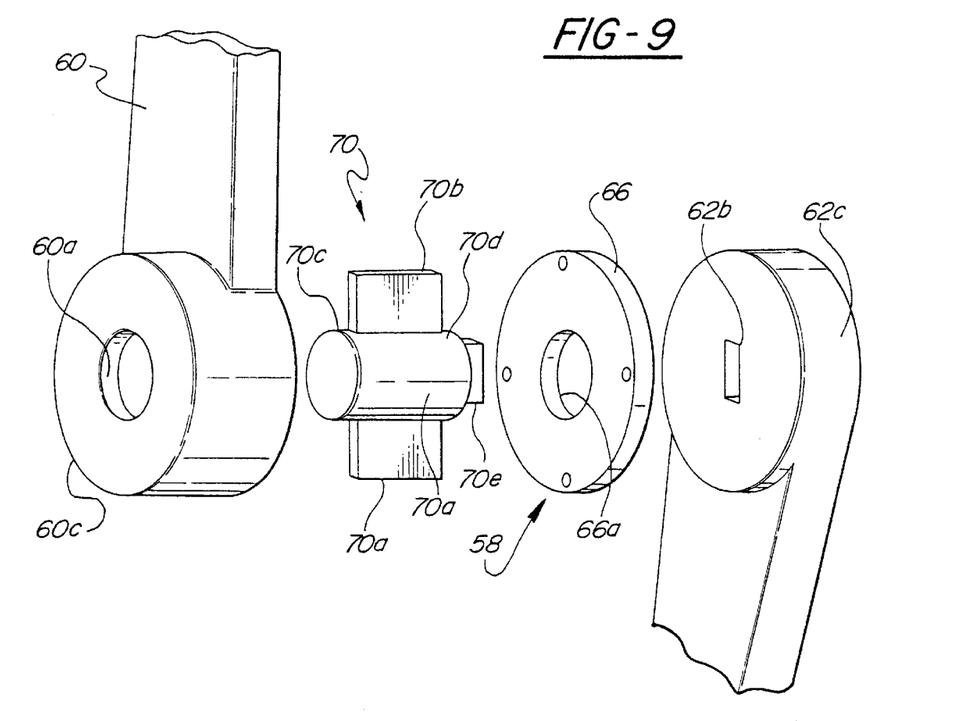
Figure 10:
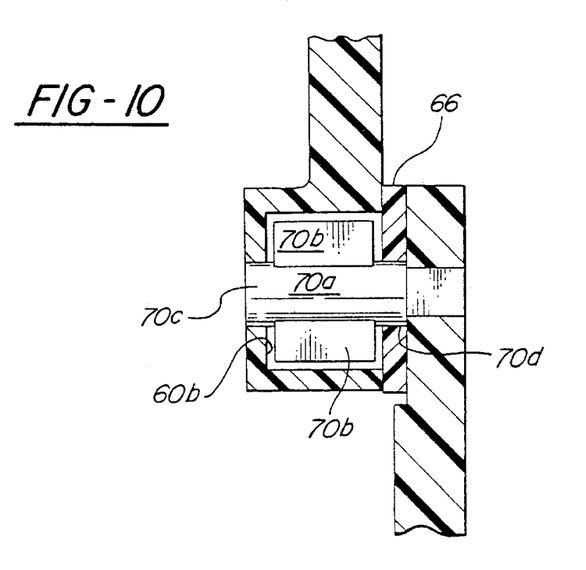

In the damper device seen FIGS. 3, 4, and 5, the second member comprises a piston 46 defining the slide structure at one end 46a thereof and secured at another end 46b thereof to the backing plate 40 of the mirror glass assembly at a location remote from pivot axis V. The end 46b of the piston is in the form of a ball joint which is snappingly received in a suitable ball joint receptacle 48 secured to the backing plate.

The first member of the damper device seen in FIGS. 3–5 comprises a cylinder 50 positioned in the cavity 30c, containing a viscous material 52, slidably receiving the end 46a of the piston 46, and secured at an end 50a thereof to mirror housing 30 by a lug 54 on the mirror housing.

Viscous material 52 may comprise, for example, a temperature-stable viscous silicon fluid.

The damper device seen in FIGS. 3–5 further includes an elastomeric boot or seal 56 mounted on the lower end of cylinder 50, slidably passing the piston 46, and precluding leakage of viscous fluid 52 out of the cylinder.

It will be seen that the piston and cylinder damper device of FIGS. 3–5 allows selective adjustment of the mirror glass assembly relative to the mirror housing utilizing positioning device 34 while acting to dampen vibrations of the mirror glass assembly relative to the mirror housing in any position of adjustment of the mirror glass assembly relative to the mirror housing. Specifically, the viscous material dampens the reciprocal movement of the piston in the cylinder whereby to present a steady mirror image to the vehicle operator in any position of adjustment of the mirror glass assembly. The strength of the damping action is a function of several factors including the viscosity of fluid 52 and the clearance between piston 46 and cylinder 50.

The damper device 58 shown in the alternate embodiment of FIGS. 6–10 has a knee action configuration. In this embodiment, the first member comprises a first arm 60 and the second member comprises a second arm 62.

The first arm 60 has a ball joint 60a at one end thereof snappingly received in a ball joint receptacle 64 mounted on the mirror housing and defines a cylindrical chamber 60b at the other end thereof which is closed by a cover 66 having a central aperture 66a.

Second arm 62 defines a ball joint 62a at a first end thereof which is snappingly received in a ball joint receptacle 66 mounted on the backing plate of the mirror glass assembly at a location remote from pivot axis V and defines a slot 62b at the other end 62c of the arm.

The damper device of the FIGS. 6–10 embodiment further includes a vane structure 70. Structure 70 includes a central pivot pin structure 70a and a pair of diametrically opposed vane structures 70b extending outwardly from the central pivot pin structure.

In the assembled relation of the damper device of the FIGS. 6–10 embodiment, a journal portion 70c of central pivot pin structure 70a is received in a central aperture 60d in the end 60c of arm 60; vanes 70b are rotatably positioned in chamber 60b; cover 66 closes chamber 60b and is positioned over a further journal portion 70d of central pivot pin structure 70a; and a flattened drive shank portion 70e of the central pivot pin structure is received with a press fit in slot 62b. Viscous fluid 52 is trapped in chamber 60b in surrounding relation to vanes 70b so that vibrational movements of the mirror assembly are damped by the viscous material trapped in the chambers 60b acting on the vanes 70b of the vane structure in response to relative pivotal movement between the arms 60 and 62 of the knee action damper arrangement. The strength of the damping action is a function of several factors including the viscosity of fluid 52 and the clearance between vanes 70b and the walls of chamber 60b.

Figure 11:
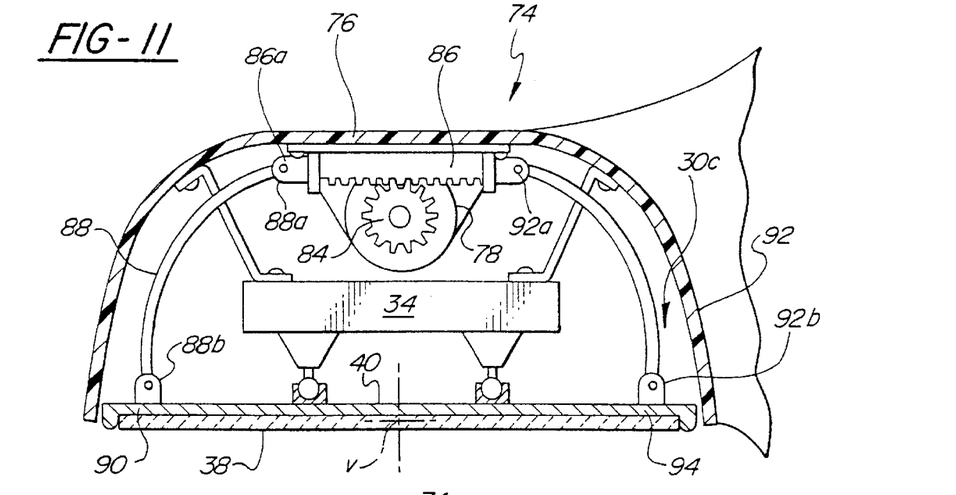
FIG. 11 is a view of a further alternative form of the damper device.
Figure 12:
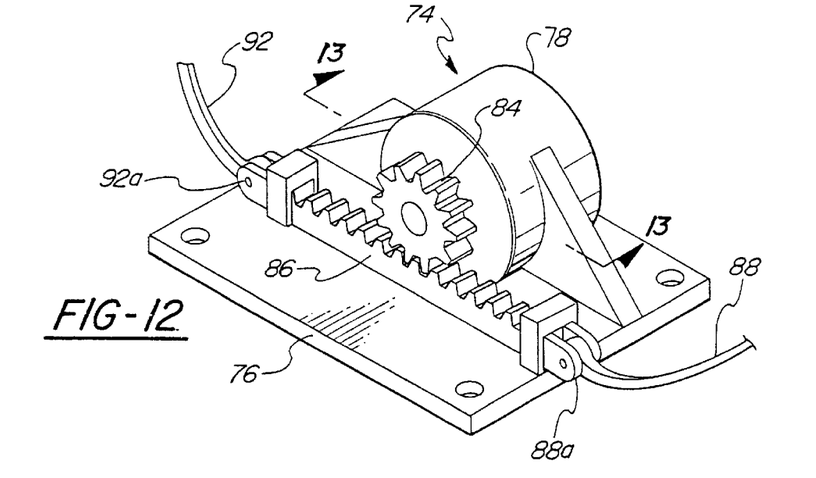
FIG. 12 is a perspective view of the damper device of FIG. 11.
Figure 13:
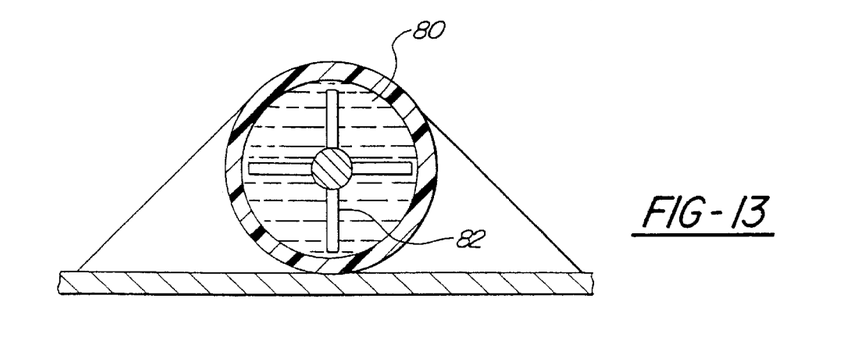
FIG. 13 is a cross-sectional view, taken on line 13—13 of FIG. 12.

The damper device 74 shown in the further alternative embodiment of FIGS. 11–13 is positioned in the cavity 30c behind actuator 34 and includes a base or bracket 76 secured to the housing rearwardly of actuator 34; a cylinder 78; a viscous fluid 80 filling the cylinder; a vane 82 mounted for rotary movement in the cylinder within the viscous fluid; a pinion 84 secured to the vane and positioned exteriorly of the cylinder; a rack 86 drivingly engaging pinion 84 and mounted for reciprocal sliding movement on base 76; a first curvilinear link 88 universally connected at one end 88a thereof to one end 86a of the rack and universally connected at another end 88b thereof to a point 90 on the backing plate 40 at one side of pivot axis V; and a second curvilinear link 92 universally connected at one end 92a thereof to another end 86b of the rack and universally connected at another end 92b thereof to a point 94 on the backing plate at another side of pivot axis V.

It will be seen that the arrangement described in FIGS. 11–13 is operative to rotate vane 82 relative to cylinder 78 in response to vibrational movement of mirror glass assembly 32 relative to housing 30. Specifically, as the mirror glass assembly moves about axis V, links 88 and 92 apply a push-pull force to rack 86 whereby to move the rack slidably on base 76. This movement of the rack on the base has the effect of rotating pinion 84 and thereby vane 82 which in turn has the effect of viscously damping or resisting the movement of the rack and thereby of the mirror glass assembly. Whereas the damper device 74 is illustrated as being secured directly to the mirror housing, it will be apparent that it can alternatively be secured to the actuator 34.

The invention will be seen to provide an outside rearview mirror for a motor vehicle in which the mirror is selectively adjustable to achieve the desired rearview image but in which the mirror is stabilized in any position of adjustment with respect to vibrations so as to present a steady mirror image.

Whereas preferred embodiments of the invention have been illustrated and described in detail, it will be apparent that various changes may be made in the disclosed embodiments without departing from the scope or spirit of the invention.

What is claimed is:

1. An outside rearview mirror assembly for a motor vehicle including a housing adapted to be attached to the motor vehicle and including an annular rim circumscribing a cavity defined by the housing, and a mirror glass assembly positioned in the cavity within the housing rim and mounted for selective movement relative to the housing to selectively vary the position of the mirror glass assembly relative to the housing and thereby selectively vary the image perceived in the mirror glass assembly by a motor vehicle operator, characterized in that:

the mirror assembly further includes a damper device positioned within the cavity between the housing and the mirror glass assembly and operative to damp vibrational movement of the mirror glass assembly relative to the housing whereby to present a steady mirror image to the operator; and the damper device comprises a first member, a second member defining a slide structure mounted for reciprocal sliding movement in the first member and thereby defining a chamber therebetween, and a viscous material trapped in and filling the chamber and dampening the reciprocal sliding movement of the slide structure in the first member, wherein said chamber is sealed, and one of said members is connected to said mirror glass assembly and the other of said members is connected to said housing to damp vibrational movement of the mirror glass assembly relative to the housing.

2. An outside rearview mirror assembly according to claim 1 wherein:

the second member comprises a piston defining said slide structure at one end thereof and secured at another end thereof to one of said housing and said mirror glass assembly; and the first member comprises a cylinder positioned in the cavity, containing the viscous material, slidably receiving said one end of said piston, and secured at another end thereof to the other of said housing and said mirror glass assembly.

3. An outside rearview mirror assembly according to claim 1 wherein:

the first member comprises a first arm secured at a first end thereof to one of said housing and said mirror glass assembly and defining said chamber at a second end thereof; and the second member comprises a second arm secured at a first end thereof to the other of said housing and said mirror glass assembly, pivotally connected at a second end thereof to the second end of the first arm, and carrying the vane structure at the second end thereof constituting said slide structure and rotatably received in said chamber.

4. An outside rearview mirror assembly according to claim 1 wherein:

the mirror glass assembly is mounted for pivotal movement relative to the housing about a pivot axis; and the damper device extends between the housing and a location on the mirror glass assembly remote from the pivot axis.

5. An outside rearview mirror assembly according to claim 1 wherein:

the mirror glass assembly comprises a mirror glass and a backing plate supporting the mirror glass; and the damper device extends between the housing and the backing plate.

6. An outside rearview mirror assembly for a motor vehicle comprising:

a housing adapted to be attached to the motor vehicle and including an annular rim circumscribing a cavity defined by the housing;

a mirror glass positioned in the cavity within the housing rim;

a backing plate positioned in the cavity in backing relation to the mirror glass and mounted for selective movement relative to the housing to selectively vary the position of the mirror glass relative to the housing and thereby selectively vary the image perceived in the mirror glass by a motor vehicle operator; and a viscous damper device positioned within the cavity between the housing and the backing plate and operative to damp vibrational movement of the mirror glass relative to the housing whereby to present a steady mirror image to the operator;

the damper device comprising a first member, a second member defining a slide structure mounted for reciprocal sliding movement in the first member and thereby defining a chamber therebetween, and a viscous material trapped in and filling the chamber and dampening the reciprocal sliding movement of the slide structure in the first member, wherein said chamber is sealed, and one of said members is connected to said backing plate and the other of said members is connected to said housing to damp vibrational movement of the mirror glass relative to the housing.

7. An outside rearview mirror assembly according to claim 6 wherein:

the second member comprises a piston defining said slide structure at one end thereof and pivotally connected at another end thereof to one of said housing and said backing plate; and the first member comprises a cylinder positioned in the cavity, containing the viscous material, slidably receiving said one end of said piston, and pivotally connected at another end thereof to the other of said housing and said backing plate.

8. An outside rearview mirror assembly according to claim 7 wherein the cylinder is pivotally connected to the housing and the piston is pivotally connected to the backing plate.

9. An outside rearview mirror assembly according to claim 6 wherein:

the first member comprises a first arm pivotally connected at a first end thereof to one of said housing and said backing plate and defining said chamber at a second end thereof; and the second member comprises a second arm pivotally connected at a first end thereof to the other of said housing and said backing plate, pivotally connected at a second end thereof to the second end of the first arm, and carrying a vane structure at the second end thereof constituting said slide structure and rotatably received in said chamber.

10. An outside rearview mirror assembly according to claim 1 wherein the first member comprises a cylinder containing the viscous material, the second member comprises a vane mounted for rotary movement in the cylinder, and the viscous damper device further includes means operative to rotate the vane relative to the cylinder in response to vibrational movement of the mirror glass relative to the housing.

11. An outside rearview mirror assembly according to claim 10 wherein the cylinder is fixedly secured to the housing within the cavity.

12. An outside rearview mirror assembly according to claim 11 wherein the operative means comprises a pinion secured to the vane, a rack driving the pinion, and means moving the rack in response to vibrational movement of the mirror glass.

13. An outside rearview mirror assembly according to claim 12 wherein:

the mirror is mounted for pivotal movement relative to the housing about a pivot axis; and the moving means comprises a first link connecting one end of the rack to a point on the mirror assembly at one side of the pivot axis and a second link connecting another end of the rack to a point on the mirror assembly at another side of the pivot axis.

14. An outside rearview mirror assembly for a motor vehicle including a housing adapted to be attached to the motor vehicle and including an annular rim circumscribing a cavity defined by the housing rim and mounted for selective movement relative to the housing to selectively vary the position of the mirror glass assembly relative to the housing and thereby selectively vary the image perceived in the mirror glass assembly by a motor vehicle operator, characterized in that:

the mirror assembly further includes a damper device positioned within the cavity between the housing and the mirror glass assembly and operative to damp vibrational movement of the mirror glass assembly relative to the housing whereby to present a steady mirror image to the operator;

the damper device comprises a first member, a second member defining a slide structure mounted for reciprocal sliding movement in the first member and thereby defining a chamber therebetween, wherein said chamber is sealed, and a viscous material trapped in the chamber and dampening the reciprocal movement of the slide structure in the first memeber;

the second member comprises a piston defining said slide structure at one end thereof and secured at another end thereof to one of the said housing and said mirror glass assembly;

the first member comprises a cylinder positioned in the cavity, containing the viscous material, slidely receiving said one end of said piston, and secured at another end thereof to the other of said housing and said mirror glass assembly; and the cylinder is securing the housing and the piston is securing to the mirror glass assembly. first member and thereby defining a chamber therebetween, wherein said chamber is sealed, and a viscous material trapped in the chamber and dampening the reciprocal movement of the slide structure in the first member;

the second member comprises a piston defining said slide structure at one end thereof and secured at another end thereof to one of the said housing and said mirror glass assembly;

the first member comprises a cylinder positioned in the cavity, containing the viscous material, slidably receiving said one end of said piston, and secured at another end thereof to the other of said housing and said mirror glass assembly; and the cylinder is securing the housing and the piston is securing to the mirror glass assembly.

* * * * *

UNITED STATES PATENT AND TRADEMARK OFFICE
CERTIFICATE OF CORRECTION

PATENT NO. : 6,264,338 B1
DATED : July 24, 2001
INVENTOR(S) : Robert W. McFarland and Richard T. Young It is certified that error appears in the above-identified patent and that said Letters Patent is hereby corrected as shown below:

Column 5,
Line 61, after "carrying" delete "the" and insert -- a --.

Column 7,
Line 29, after "housing" delete "rim and" and insert -- and a mirror glass assembly positioned in the cavity within the housing --

Column 8,
Line 21, after "assembly" delete everything starting with "first member" and continuing to line 37 ending with "mirror glass assembly."

Signed and Sealed this

Twenty-fourth Day of June, 2003

JAMES E. ROGAN
*Director of the United States Patent and Trademark Office*